United States Patent [19]

Blundell

[11] Patent Number: 5,703,606
[45] Date of Patent: Dec. 30, 1997

[54] THREE DIMENSIONAL DISPLAY SYSTEM

[76] Inventor: Barry George Blundell, 10 Hanover Place, Ilam, Christchurch 8004, New Zealand

[21] Appl. No.: 397,050
[22] PCT Filed: Sep. 10, 1993
[86] PCT No.: PCT/NZ93/00083
 § 371 Date: Apr. 25, 1995
 § 102(e) Date: Apr. 25, 1995
[87] PCT Pub. No.: WO94/06248
 PCT Pub. Date: Mar. 17, 1994

[30] Foreign Application Priority Data

Sep. 10, 1992 [NZ] New Zealand ............................ 244290
Aug. 9, 1993 [NZ] New Zealand ............................ 248352

[51] Int. Cl.⁶ .............................. G09G 1/20; H04N 13/04
[52] U.S. Cl. .................................. 345/22; 345/6; 345/31
[58] Field of Search ........................ 345/6, 31, 10, 345/20, 22; 342/180; 348/51; 313/149, 152

[56] References Cited

U.S. PATENT DOCUMENTS

| 2,330,682 | 9/1943 | Clothier et al. | 313/152 |
| 2,967,905 | 1/1961 | Hirsch | 178/6.5 |
| 3,140,415 | 7/1964 | Ketchpel | 342/180 |
| 3,204,238 | 8/1965 | Skellett | 342/180 |
| 5,214,419 | 5/1993 | DeMond et al. | 345/32 |

FOREIGN PATENT DOCUMENTS 426 260  4/1975  United Kingdom .

OTHER PUBLICATIONS

Ketchpel, "Direct-View Three-Dimensional Display Tube", *IEEE Transactions on Electron Devices*, Sep. 1963, pp. 324–328.
Patent Abstract of Japan, vol. 13, No. 68, (E–716), Feb. 16, 1989 abstract of Hidenori EGAWA, "Picture Tube For Three Dimensional Image Display", Japanese 63–254647, Oct. 21, 1988.

*Primary Examiner*—Jeffery Brier
*Attorney, Agent, or Firm*—Foley & Lardner

[57] ABSTRACT

A three-dimensional display device comprising an evacuated enclosure (45). A phosphor coated screen (44), means to rotate the phosphor coated screen, one or more electron gun (41-43) and control means to drive the one or more electron gun. Sequential image Frames (FIGS. 2b–2f) are written to the rotating phosphor coated screen (44) by the one or more electron gun (41–43) for a number of image sectors. Provided the screen rotates sufficiently rapidly and the phosphor coating has the required persistence the human eye will perceive a three-dimensional image within the display volume swept out by the phosphor coated screen. In the preferred embodiment the planar screen (44) rotates about a vertical axis with three electron guns (41–43) located below the display volume directed upwardly towards the center of the display volume. In another embodiment the display screen is in the form of a helix (51) with the electron gun (52) being aligned substantially along the axis of rotation of the helix.

25 Claims, 10 Drawing Sheets

THREE DIMENSIONAL DISPLAY SYSTEM

TECHNICAL FIELD

The present invention relates to a system for displaying three-dimensional images. More particularly, the invention relates to a system consisting of a rotating phosphor coated screen and one or more electron guns writing images to the screen. As the screen sweeps out a display volume the one or more electron guns fire at the screen to excite the phosphor coating to produce voxels at the required points in three-dimensional space.

BACKGROUND OF THE INVENTION

To the present time many methods of producing three-dimensional displays have been suggested. Some systems require a user to wear differently coloured or polarised glasses. The different information being presented to each eye results in the illusion of depth. Such systems are non-volumetric, require the user to wear special glasses and can only be observed over a limited range of angles.

Another proposal relies upon the intersection of beams of radiation to create voxels in three-dimensional space. In one proposal voxels are generated at the intersection of two electron beams in a volume of nitrogen gas. In this proposal the energy of each beam is just below the threshold energy density required for the luminous transition of nitrogen gas. Only at the intersection of the beams is the energy density high enough to generate a luminous voxel. However, no working implementation of this proposal appears to have been produced.

According to another proposal a laser beam is directed at a translucent rotating screen. Such devices are expensive and it is difficult to accurately direct the laser beam.

DISCLOSURE OF THE INVENTION

It is an object of the present invention to provide a three-dimensional display system which produces true three-dimensional images and can be commercially produced relatively inexpensively, or to at least provide the public with a useful choice.

According to one aspect of the invention there is provided a display system comprising:

- an evacuated enclosure, at least part of said enclosure being transparent;
- a phosphor coated screen within the enclosure;
- means to rotate said screen within the enclosure so that the screen sweeps out a display volume;
- one or more electron gun within the enclosure positioned so that images may be written to the screen as it sweeps out the display volume; and
- control means to provide drive signals to the one or more electron gun in accordance with image information supplied thereto.

The screen may be in the form of a generally planar screen or a helix. The one or more electron gun is preferably positioned above or below the display volume. For a planar screen embodiment the screen preferably rotates about a vertical axis of rotation and three or more circumferentially spaced apart electron guns are provided below the display volume and are angled upwardly towards the centre of the display volume. Preferably a conductor is provided around the periphery of the screen which provides an alignment signal to the control means when hit by an electron beam. The gun alignment signals may be used by the control means to compensate for gun misalignment.

In a preferred embodiment each side of a generally planar screen is divided in half about the axis of rotation of the screen and a different coloured phosphor is applied to each of the four screen halves in such a manner as to ensure phosphor transparency. For a planar screen embodiment the x deflection plate voltages supplied to the x deflection plates of each electron gun are preferably scaled by a sinusoidal function synchronised with the rotation of the screen to scale the x deflection plate voltages in accordance with the target area of the screen exposed to the gun. The means to rotate the screen preferably includes a motor outside the enclosure which rotates the screen via a magnetic coupling through the enclosure. The screen preferably rotates at a speed greater than or equal to 15 hz. The enclosure is preferably formed in two halves to simplify construction.

BRIEF DESCRIPTION OF THE DRAWINGS

The invention will now be described by way of example with reference to the accompanying drawings in which.

Referring now to FIG. 1 and FIGS. 2a to 2f the fundamental principles of operation of the display of the invention will be described. As screen 1 rotates about axis 2 (as indicated by arrow A) the screen 1 sweeps out a cylindrical volume. Although rotation is shown about a vertical axis it will be appreciated that the screen may be rotated about an axis having any desired inclination to the vertical. An electron gun 3 is provided with x and y deflection plates 4 enabling electron beam 5 to be directed at any desired points on screen 1 at any chosen angle of the screen with respect to the electron gun 3. If the screen 1 is provided with a phosphor coating the phosphor will emit light at the point where electron beam 5 hits the phosphor coated surface of screen 1. By firing the electron gun 3 at a particular point on screen 1 when it is at a given angle relative to the axis of electron gun 3, almost any point within the cylindrical volume of the display may be illuminated. Each such point is referred to in the specification as a "voxel". A voxel is each point in three-dimensional space which forms part of a three-dimensional image, corresponding to a pixel in two-dimensional television systems.

By firing the electron gun at a number of points on screen 1 for a given angle $\ominus$ a slice of a three-dimensional image may be generated. Referring now to FIGS. 2a to 2f the method of the present invention is illustrated in a simple example. FIG. 2a is a plan view of the apparatus shown in FIG. 1 looking down on axis 2 (only half the screen being shown). In this example a simple sphere is generated by producing a sequence of frames at different angles of the screen relative to the axis of the electron gun 3. For this example the outline of the sphere 6 is superimposed for various angles of the screen relative to the axis of the electron gun 3. For each angle of the screen shown in FIGS. 2b to 2f the dots indicate the points at which the phosphor coating of the screen is excited by the electron beam. These different screen positions are numbered 7, 8, 9, 10, 11 respectively. These sequential frames are referred to in this specification as "sectors". If the display volume is divided into say 256 sectors then 256 equally spaced frames are generated.

Figure 2A:
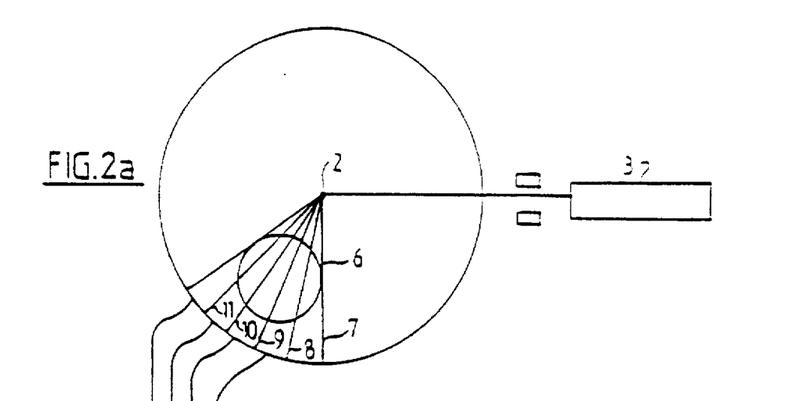
FIGS. 2A to 2F: illustrate the operation of the display system shown in FIG. 1.
Figure 2B:
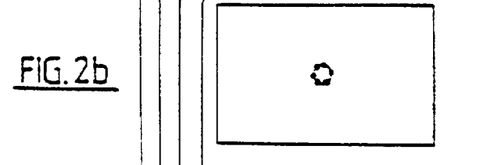

When the display screen is in the position indicated by numeral 7 the circle shown in FIG. 2b is generated. The circle is generated by firing the beam of electron gun 3 at the display points defining the circle. Thus the phosphor coating is excited to produce visible light in the pattern of the points excited by the electron gun.

Figure 2C:
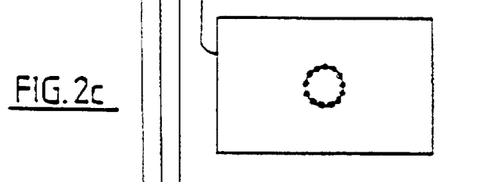
Figure 2D:
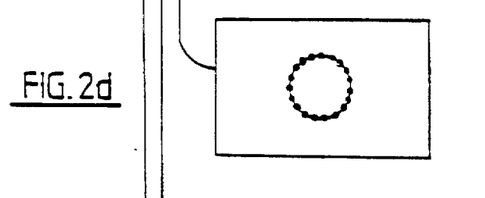
Figure 2E:
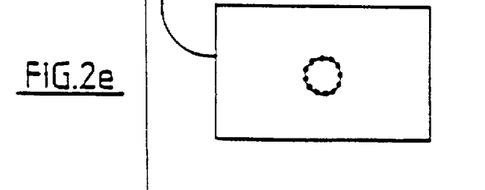
Figure 2F:
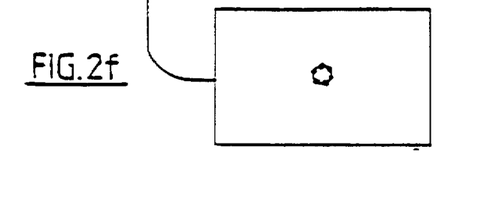

At the next position 8 of screen 1 the frame shown in FIG. 2c is generated during a single revolution of the screen. This is a slightly larger circle representing the next slice of sphere 6. The phosphor coating of screen 1 will preferably have a very short persistence so that the frames do not form trails as the screen 1 rotates. Certainly, by the time the screen moves from position 7 to position 8 the image generated in frame 7 will no longer persist. Likewise for FIGS. 2d to f, these frames will be generated when screen 1 is at positions 9, 10 and 11 respectively.

For each rotation of screen 1 the same frames 2b to 2f are re-written at the same angular position of the screen 1, until the image displayed is to be changed. If the screen 1 rotates at sufficient speed there will be minimal flicker and all of the points defined in frames 2b to 2f will be observed by the human eye simultaneously, as each of the frames 2b to 2f will persist as perceived by the human eye. If a large enough number of voxels are generated a solid three-dimensional object may be perceived. In this example however the resolution is relatively coarse.

The maximum number of voxels per sector is dependant upon the bandwidth of the system and the number of sectors Ns. The bandwidth of the system B is the maximum number of voxels that can be output to the display volume per second. Thus the maximum number of voxels per sector Vs is given by:

$$Vs = \frac{B}{Ns} \times \frac{1}{f}$$

where f is the frequency of rotation of the screen.

Figure 3:
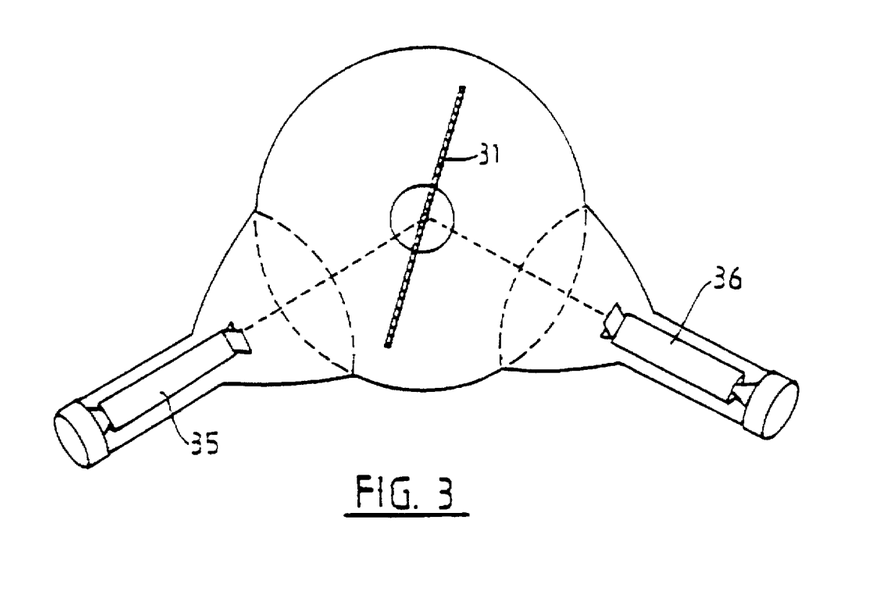
FIG. 3: shows a plan view of a three-dimensional display system according to a first embodiment, using two electron guns and a planar screen.
Figure 4:
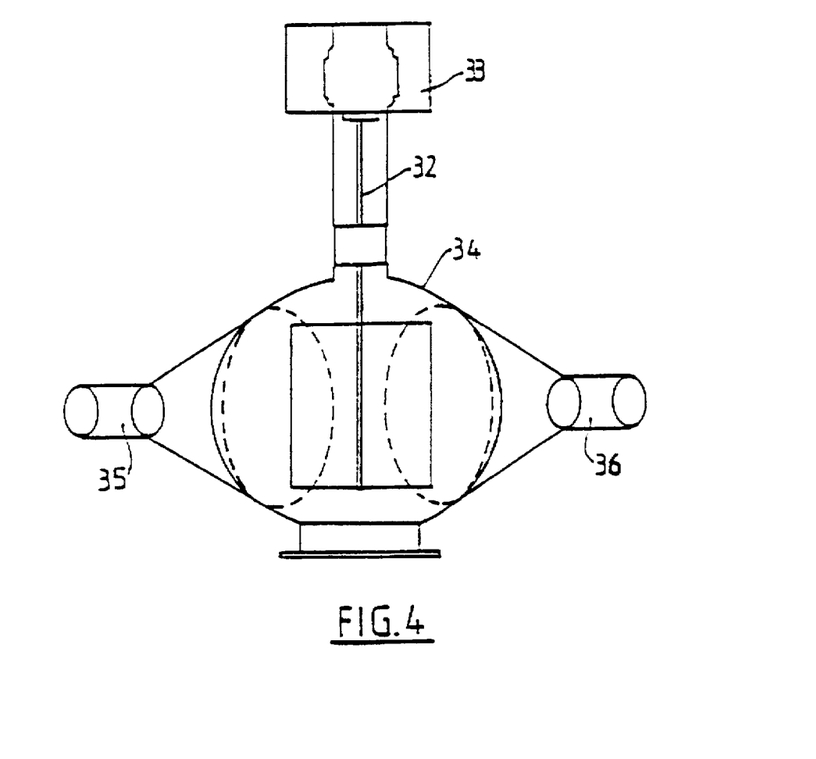
FIG. 4: shows a side view of the display system shown in FIG. 1.

Referring now to FIGS. 3 and 4 a first practical implementation is shown. A phosphor coated screen 31 is supported by a drive shaft 32, which is rotated by motor 33 via a magnetic coupling. The motor rotates a magnet about the outside of enclosure 34 which is magnetically coupled to a magnetic material inside the enclosure connected to shaft 32. The shaft 32 and screen 31 are contained within the evacuated glass enclosure 34.

At least part of enclosure 34 is transparent to allow the image generated to be viewed. Motor 33 is magnetically coupled to shaft 32 to avoid sealing problems associated with the drive arrangement.

Electron guns 35 and 36 are arranged about the meridian and directed towards the central axis of screen 31. The electron guns may suitably be 3K5U guns with oxide coated cathodes using electrostatic deflection, although electron guns using magnetic deflection could be employed. Each electron gun 35, 36 writes images to the display screen for a range of angles of the screen relative to the axes of electron guns. In this way, throughout an entire rotation of phosphor coated screen 31, all the points of a three-dimensional image may be written to.

If only a single gun is provided there is a "dead zone" for part of the image. The images cannot be written to the phosphor coated screen 31 when the screen is in line with a single gun. When the angle of the beam of a single electron gun is at an acute angle to the surface of the screen the voxels become too long, and well defined images cannot be generated. It is also difficult to produce x deflection plate voltages to the required accuracy. Accordingly, to generate a well defined three-dimensional image throughout the entire swept volume, two guns are provided. These are preferably spaced about 120° apart. To avoid flicker it has been found that the phosphor coated screen 31 should be rotated at not less than 15 hz. It is preferred that the phosphor coated screen 31 be rotated at about 15 hz to maximise the bandwidth available to generate voxels.

The phosphor coated screen 31 may be coated with phosphor on one side only. In this embodiment gun 35 fires at screen 31 for a first range of angles of rotation of screen 31 and electron gun 36 writes to screen 31 for a second range of angles of rotation of screen 31. The ranges through which each gun writes to screen 31 being determined so as to avoid either gun writing to the screen at oblique angles.

Figure 5:
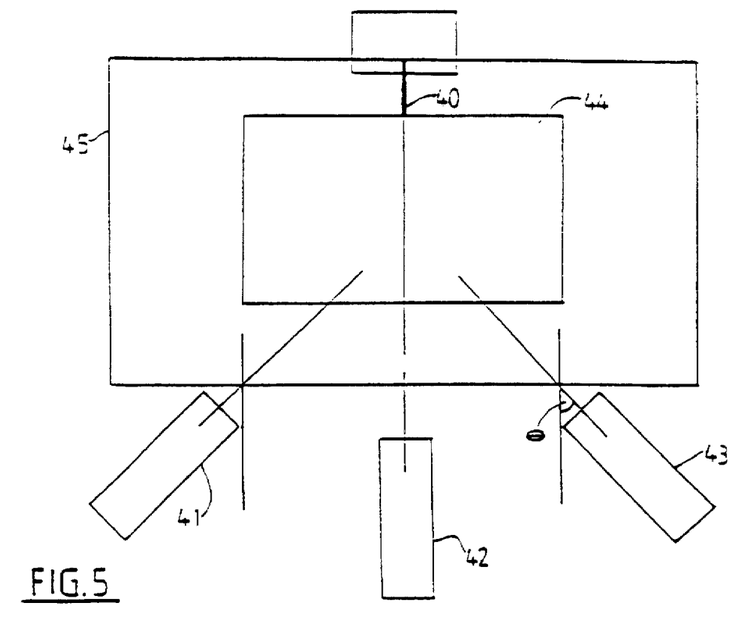
FIG. 5: shows a side view of a display system according to a second embodiment.
Figure 6:
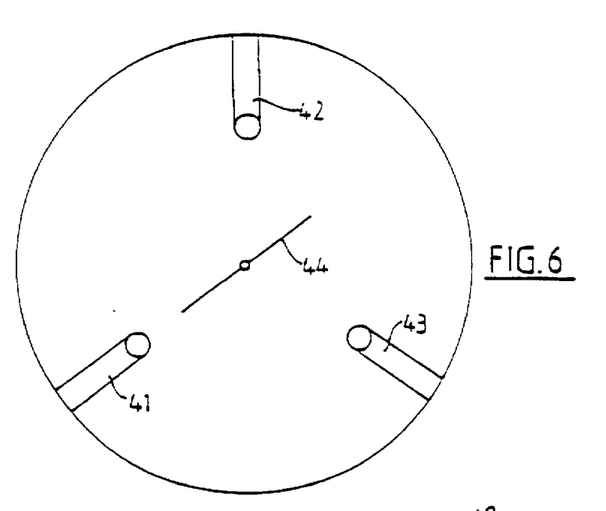
FIG. 6: shows a plan view of the display system shown in FIG. 5.

Referring now to FIGS. 5 and 6 a preferred embodiment is shown. In this embodiment 3 guns 41, 42 and 43 are positioned below enclosure 45 with the axes of the guns oriented at an angle towards phosphor coated screen 44. The axes of the electron guns are preferably oriented towards the centre of screen 44 at an angle $\ominus$ between 30° to 65° to the axis of shaft 40. More preferably the angle will be between 40° to 60°. This configuration has the advantage that the electron gun cones do not obscure the view of the image. It is to be appreciated that in an alternate embodiment the guns could be provided in the top of the enclosure angled downward and inwardly toward the screen. It is however preferred that the guns are provided in the base so that they do not obscure viewing from above. In alternate embodiments four or more guns may be provided about the screen. Preferably the guns are positioned below the display screen. An increased number of guns increases the number of available voxels, but also increases cost and complexity.

The external wall of the evacuated vessel 45 is preferably cylindrical or spherical. This makes it easier to deal with implosions. Preferably a perspex cover is provided about glass vessel 45.

The screen is preferably planar and of rectangular outline, although it will be appreciated other shapes may be used. The use of a multi-sided screen (e.g. octagonal or circular) increases the display vessel volume to useable volume ratio. In one aspect of the invention screen 44 may be phosphor coated on one side only. Each gun 41, 42, 43 writes to phosphor coated screen 44 when it is within its 120° sector (i.e. 60° either side of the screen being perpendicular to the axis of the electron gun).

Figure 7:
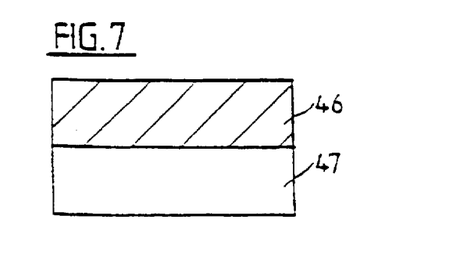
FIG. 7: shows an alternative phosphor coated screen for use in the display system of FIGS. 5 and 6.

According to another aspect of the invention, shown in FIG. 7, the top half of the screen 44 may be coated with phosphor on one side and the bottom half 47 coated with phosphor on the other side. In this way one or other gun can write to the screen throughout a full 360° of revolution, rather than through just approximately 180° of revolution as occurs when a screen is coated on a single side only. This enables more voxels to be provided.

Figure 8:
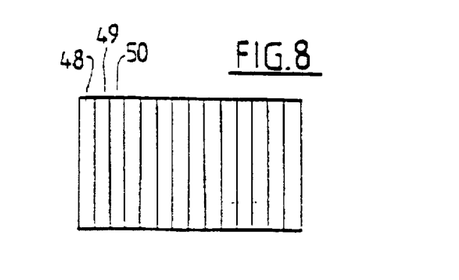
FIG. 8: shows an alternative phosphor coated screen for use with a colour system.

According to another aspect of the invention, shown in FIG. 8, a colour image may be produced. Alternating vertical strips 48, 49, 50 may be coated with phosphor producing different colours when excited. Naturally, for a practical implementation, the lines of phosphor coating would be very close together. By exciting a particular band of phosphor the required colour may be generated. Alternatively, the strips may be provided horizontally on the screen. This method has the disadvantage that the electron beams must be very accurately directed so that they hit the appropriate strip.

Figure 19:
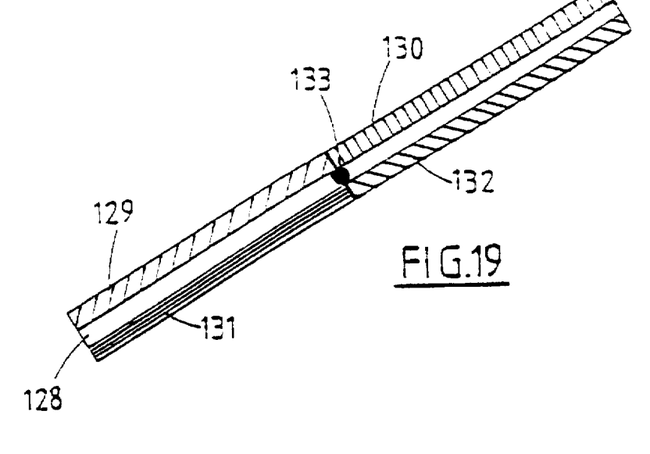
FIG. 19: shows an axial view of a screen for a colour display embodiment.

The preferred screen construction for a colour display system is shown in FIG. 19. In this embodiment different coloured phosphors 129, 130, 131 and 132 (i.e. phosphors producing different colours when excited by an electron beam) are coated on each half of each side of screen 128. Each side is divided in half vertically along the axis of rotation 133 of screen 128. Each half of each side is coated with a different coloured phosphor. Preferably, the four colours of phosphor used are red, blue, green and white. The super-imposition of different coloured voxels allows the full range of visible colours to be generated. The inclusion of white as one of the phosphor colours allows pure white voxels to be easily produced. To achieve high definition images it is important to ensure that the phosphor layers on the screen are transparent, so that blurring of the voxels is reduced. It is to be appreciated that FIG. 19 is illustrative only and that the phosphor layers on the screen would be very thin. For this embodiment it is preferred that three or more electron guns are provided evenly spaced around the screen in order that all colours may be addressed at all points of the display volume without the screen passing through a dead zone. To avoid image obstruction the three guns will preferably be positioned below the equator (see FIGS. 5 and 6).

Many demands are placed upon the phosphor used in the present application. It must have very short persistence so that trails are not produced as well as being well bonded to the rotating screen so that it does not become dislodged therefrom. The preferred phosphor for use in monochromatic displays is phosphor P31, P5, P20 or P45. The screen to which this is applied is preferably a glass screen. The screen is preferably between about 0.2 to 2 mm thick to reduce dead zones and minimise internal refraction. The phosphor is baked onto the glass so that it is well bonded thereto. Preferably, the phosphor is heated to just below its critical temperature so that optimum bonding with the glass is achieved without destroying the phosphor. Phosphor P31 is desirable due its high conversion efficiency and short persistence. Preferably a transparent phosphor is used so that the image generated is not obstructed and so defocused by the screen. The phosphor is preferably eroded from the surface of the screen until it becomes translucent. The image intensity is a function of the phosphor type, voxel dwell time and electron beam acceleration voltage. Image intensity may be increased using electron guns equipped with post deflection accelerator meshes.

In single and multi-gun systems it is important to ensure that the guns are properly aligned with the screen to minimise distortion. In multiple gun systems it is further important to ensure that the guns are accurately aligned to ensure a smooth transition between image portions written by different guns. To align the guns with a required degree of accuracy during production would be difficult and expensive. Further, this approach would require retuning of the system should the guns become misaligned or the amplifier characteristics vary.

Figure 15:
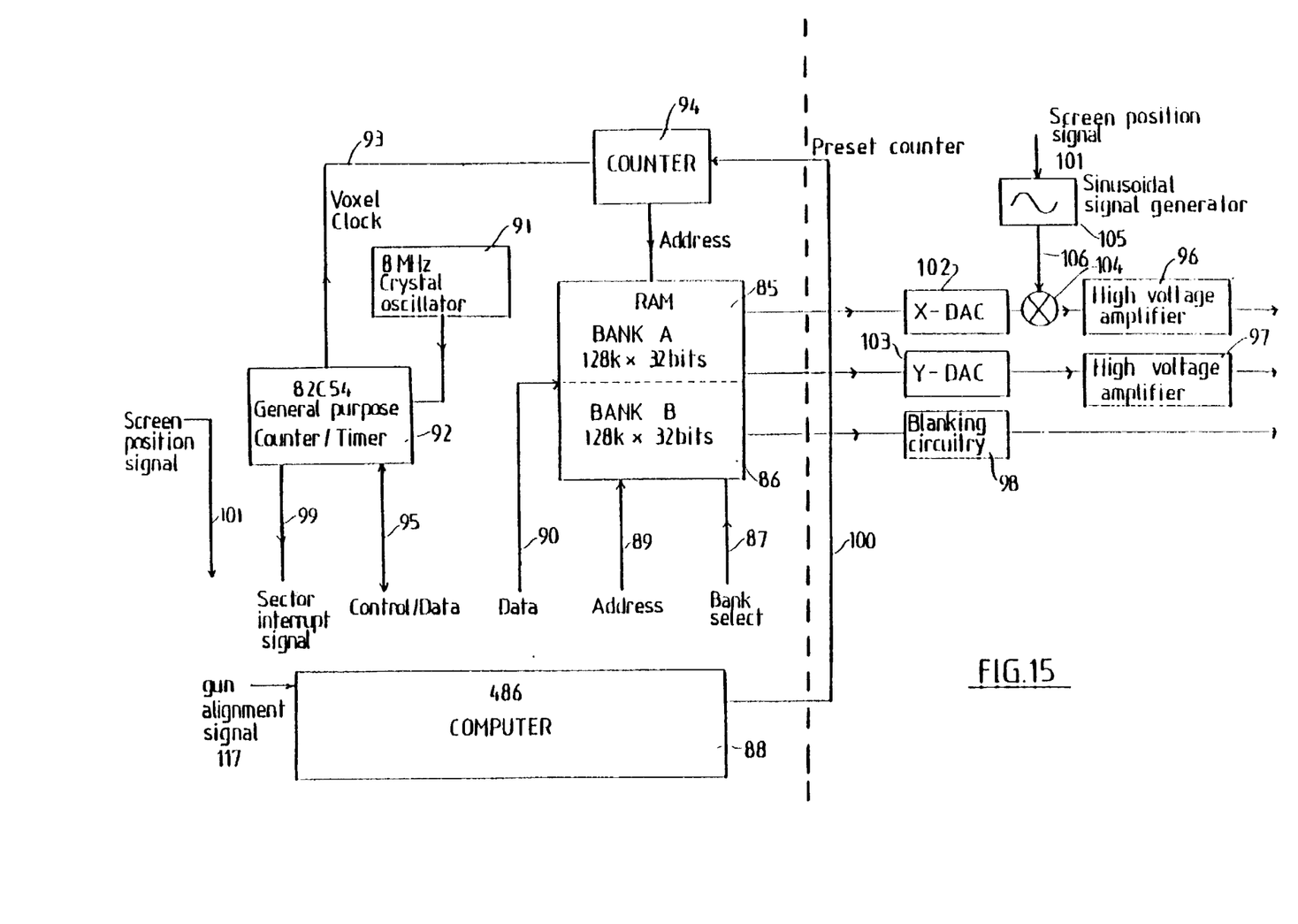
FIG. 15: shows a second display circuit for driving each electron gun of a display.
Figure 16:
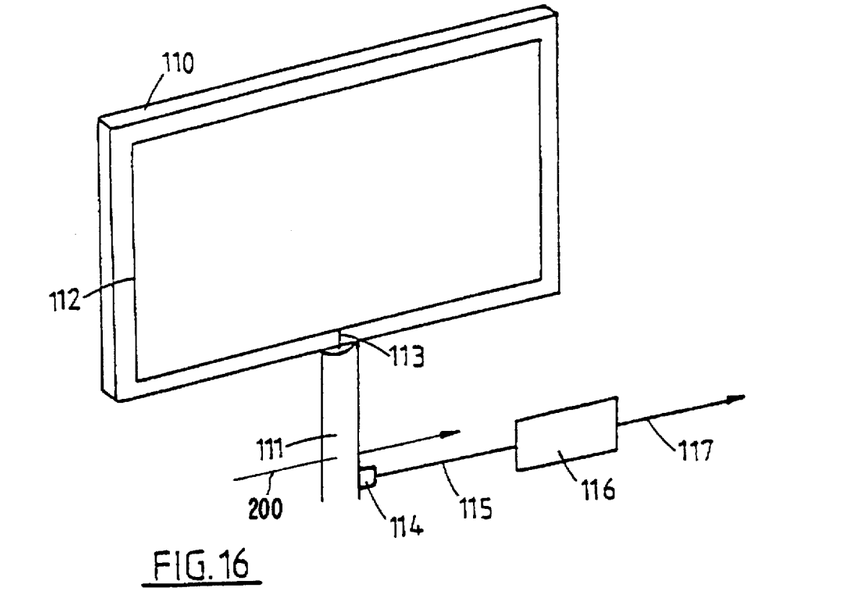
FIG. 16: shows diagrammatically an arrangement for aligning the guns of a display system with respect to the screen.

Referring now to FIG. 16 a preferred arrangement for effecting gun alignment is shown. Phosphor coated screen 110 is the screen of a display device, such as screen 44 shown in FIGS. 5 and 6. A thin conductor 112, in this case a wire, is secured around the perimeter of screen 110. The edges of wire 112 are in a shape which can be used for calibration and are preferably parallel with the edges of screen 110. Shaft 111 rotates screen 110. Connector 113 provides an electrical connection between wire 112 and metal shaft 111. Brush 114 forms an electrical connection between rotating shaft 111 and conductor 115. Alternatively conduction may be through the bearings supporting shaft 111. Line 115 is connected to the input of amplifier 116 which produces an output signal on line 117 which is supplied to the control computer (see FIG. 15).

When an electron beam hits wire 112 it generates a current which flows via connector 113, shaft 111 and line 115 to amplifier 116. Amplifier 116 produces an output signal which is supplied to the control computer via line 117. Using this signal a number of measurements can be made. Firstly, the position at which the screen is perpendicular to the beam of the gun can be determined. For this test the electron beam scans across the screen from left to right at a constant y plate deflection voltage (preferably such that the electron beam scans the central portion of the screen). Whenever the electron beam hits wire 112 a signal is supplied to the control computer via line 117. At the angular position of screen 110 at which the time between horizontal scanning signals is greatest the control computer knows that the screen is perpendicular to a particular gun. Secondly, by conducting a number of sweeps of the electron beam horizontally across the screen at different y plate deflection voltages and vertically up and down along the screen at different x plate deflection voltages gun misalignment may be calculated by the computer and appropriate steps taken to compensate for the misalignment. By processing the gun deflection voltages and signals from line 117 the computer can determine the plate deflection voltages at which the electron beam is aligned with the perimeter wire 112. For example, guns may not be aligned with the axis of rotation of the screen and/or there may be rotational misalignment. Such alignment can be tested as described above and compensated for by the computer. Images written by a particular gun can be shifted and/or rotated so that they are written to the correct position on screen 110. If the conductor 112 is provided about the perimeter of the screen the computer knows the x and y deflection plate values within which the images must be written.

Such alignment calibration tests would normally be carried out at start-up of a display. Gun misalignment tests could however also be carried out automatically at regular intervals to compensate for any variation during operation due to deflector plate amplifier drift etc.

Figure 20:
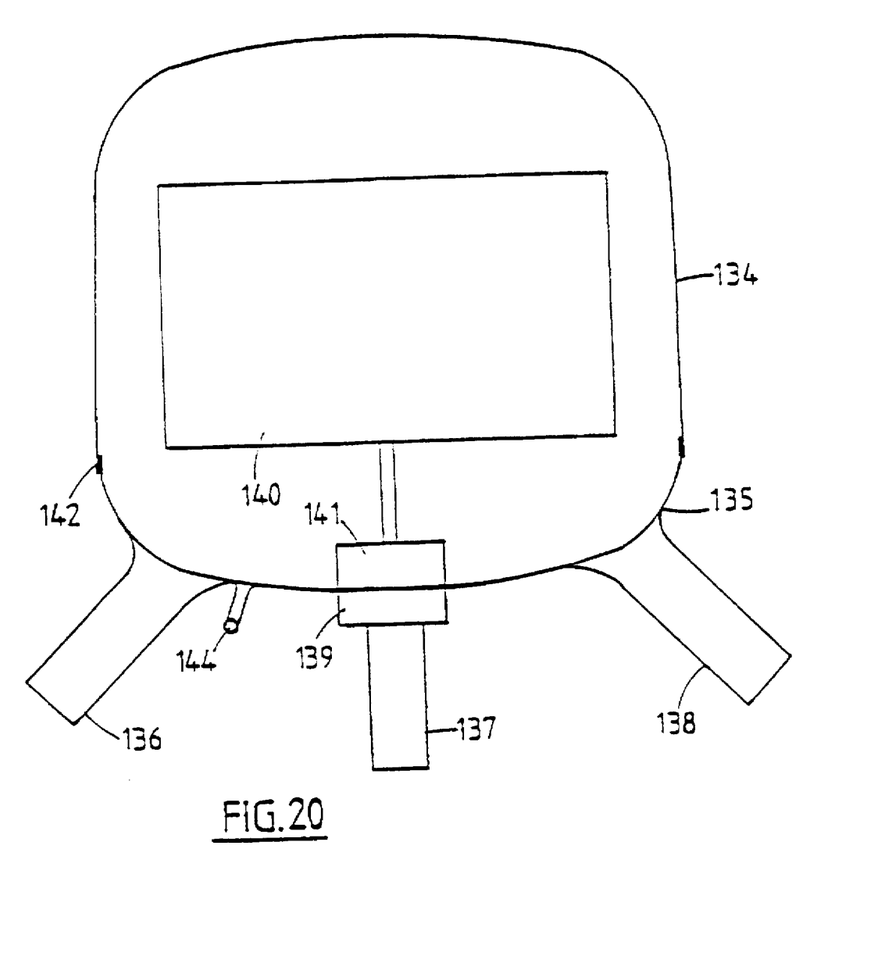
FIG. 20: shows a preferred enclosure construction.

Referring now to FIG. 20 the preferred enclosure construction will now be described. The preferred enclosure consists of two halves 134 and 135. This form of enclosure allows the magnetic coupling 141 and screen 140 to be positioned and secured in base 135 before top half 134 is secured to base 135. Top half 134 is transparent and preferably formed of glass. Bottom half 135 is also preferably formed of glass. This form of construction allows screen 140 to utilise the available display volume to best advantage. Once the internal components have been positioned and secured in their operating positions top half 134 of the enclosure is fixed to base half 135. Motor and magnetic coupling 139 may then be secured to the base of the enclosure.

Figures 17, 21:
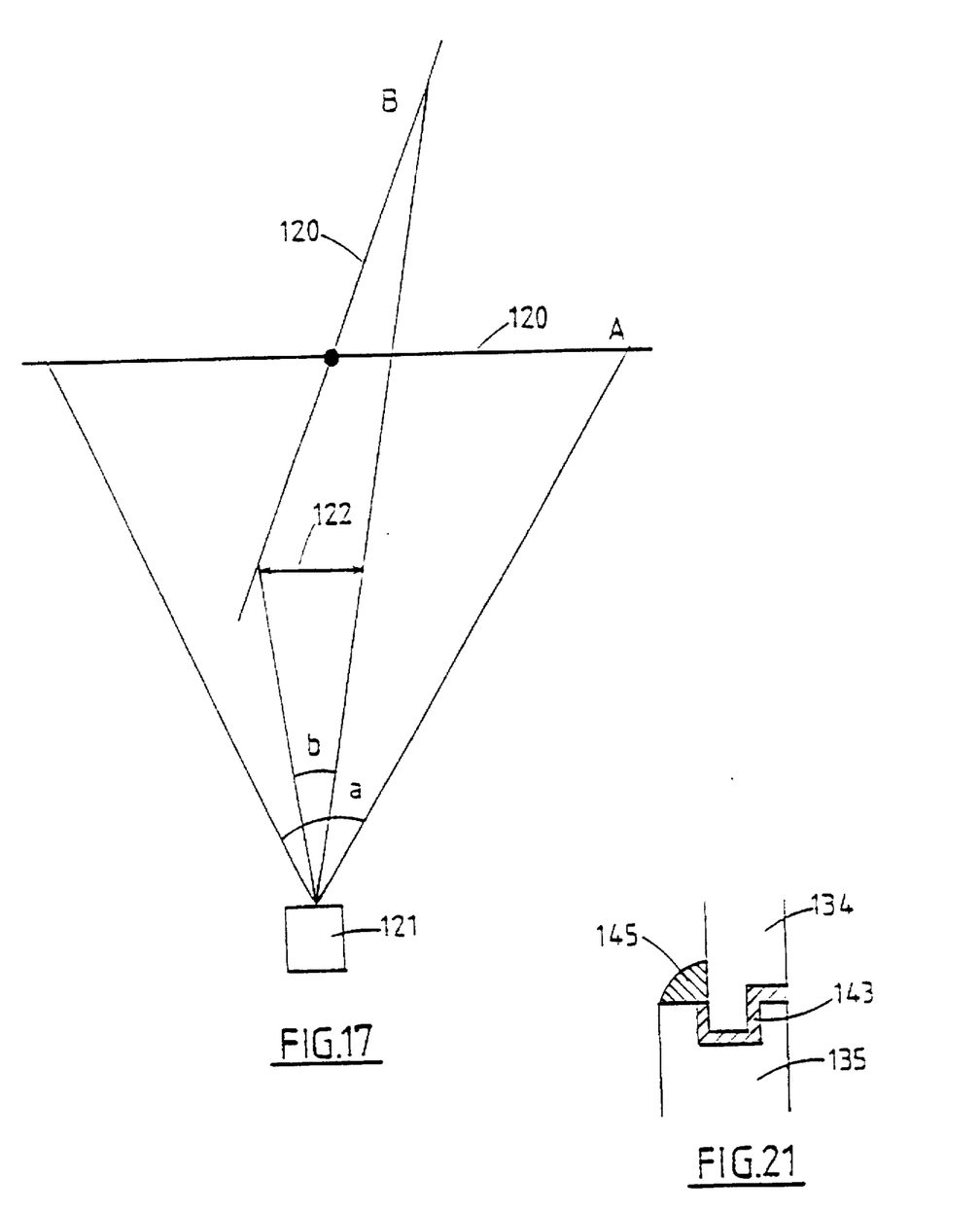
FIG. 17: illustrates the decreased target area exposed to a gun as a screen rotates.
FIG. 21: shows a joint between the two halves of the enclosure of FIG. 20.

FIG. 21 is an enlarged view of a possible cross section of the joint 142 between the top and bottom halves of the enclosure. Top half 134 and bottom half 135 are glued together by a glue 143 which can securely glue glass and maintain a vacuum, such as AREMCO 503 CERAMA bond. The enclosure is then baked and evacuated through tube 144 and sealed. A ring of glue 145 may then be provided around the enclosure between the top and bottom halves to ensure that the two halves are mechanically secured together. The top half 134 of the enclosure may then be surrounded by a plastic cover to provide protection in case of implosion.

Figure 9:
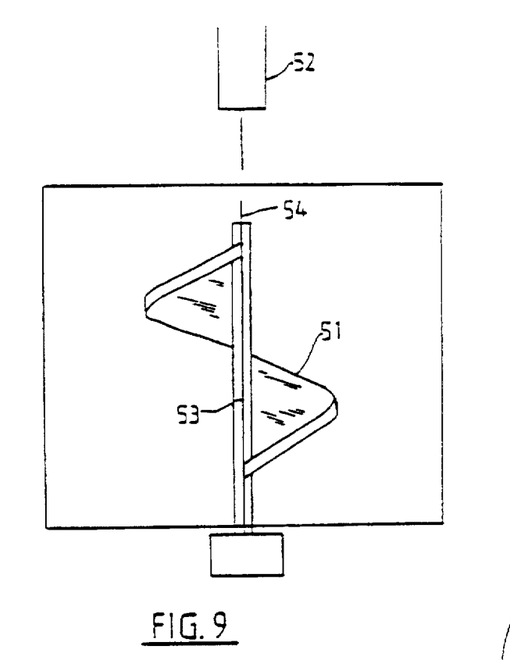
FIG. 9: shows a side view of a helical display system according to a third embodiment.

Referring now to FIG. 9 a third embodiment is shown. In this embodiment the phosphor coated screen is in the form of a helix 51 supported by a shaft 53. The electron gun 52 is aligned along the axis of shaft 53. The gun may be provided above or below the helix. Helix 51 may be phosphor coated glass or phosphor coated wire mesh. This arrangement has the advantages that only a single electron gun is required to write to all voxels within the volume and the use of a helix enables a raster scan method to be used.

Figure 10:
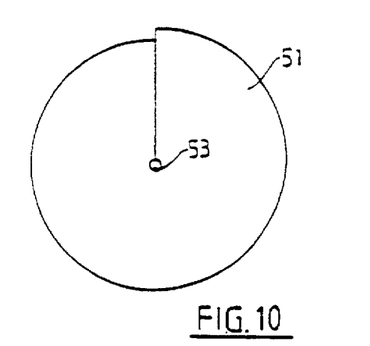
FIG. 10: shows a plan view of the helical screen of the embodiment shown in FIG. 9.
Figure 11:
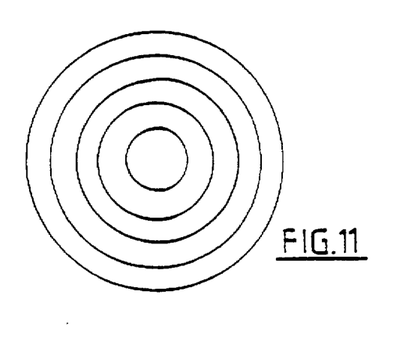
FIG. 11: shows a raster scan of concentric circles projected onto the helical screen of FIG. 10.

Looked at along the axis of shaft 53, the helix is seen to be a circle in plan, as shown in FIG. 10. If deflection voltages are applied to the deflection plates of electron gun 52 to describe a series of concentric circles, then the gun merely need be fired when the deflection potentials are such that the beam will be directed to the desired point of screen 51. In this way, for each sector (i.e: each angle of rotation of the screen), a raster scan of concentric circles can be produced on to the plan view of screen 51, shown in FIG. 11, in the same way as a raster scan is produced across a television set. This avoids the need to apply deflection potentials to the electron gun to position the electron beam at each desired location, as is required with the dot graphics approach of the previous embodiments. All that must be done is to fire the electron gun when the deflection potentials correspond to the position of the raster scan where a voxel is required.

Thus the deflection plate amplifiers may be simplified; tuned amplifiers replacing the DC to high frequency amplifiers used at present. Furthermore electrostatic deflection presently employed may be replaced by magnetic deflection. In turn this will allow the electron beam acceleration voltages to be increased and lead to images of higher intensity.

The raster scan of concentric circles can easily be generated by supplying a function A sin wt to one pair of deflection plates and a function A cos wt to another pair of deflection plates. By varying the amplitude function A concentric circles may be generated.

Figure 12:
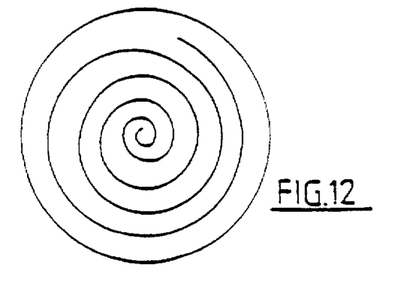
FIG. 12: shows a spiral raster scan projected onto the helical screen of FIG. 10.

According to another embodiment the amplitude function is kept constant so as to define a circle concentric with the outer edge of the circular boundary of the helix in plan view (see FIG. 10). The electron beam may be deflected towards or away from the centre of the helix by applying a voltage at conductor 54 to attract the electron beam inwards or repel the beam outwards. Conductor 54 may pass through a glass insulating tube through the centre of the helix. If the voltage is applied to conductor 54 in a stepwise manner the raster scan would consist of a number of concentric circles. According to an alterative embodiment a ramp voltage could be applied to conductor 54. This would result in the spiral raster scan shown in FIG. 12.

Figure 13:
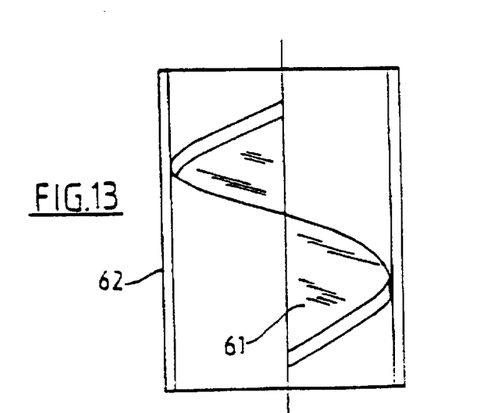
FIG. 13: shows an alternative construction of the helical display screen.

Referring now to FIG. 13 a preferred construction of the helical screen is shown. The helical screen 61 is supported along its outside edges within a transparent cylinder 62. In this way there is no support shaft in the centre to obscure the image generated.

Figure 18:
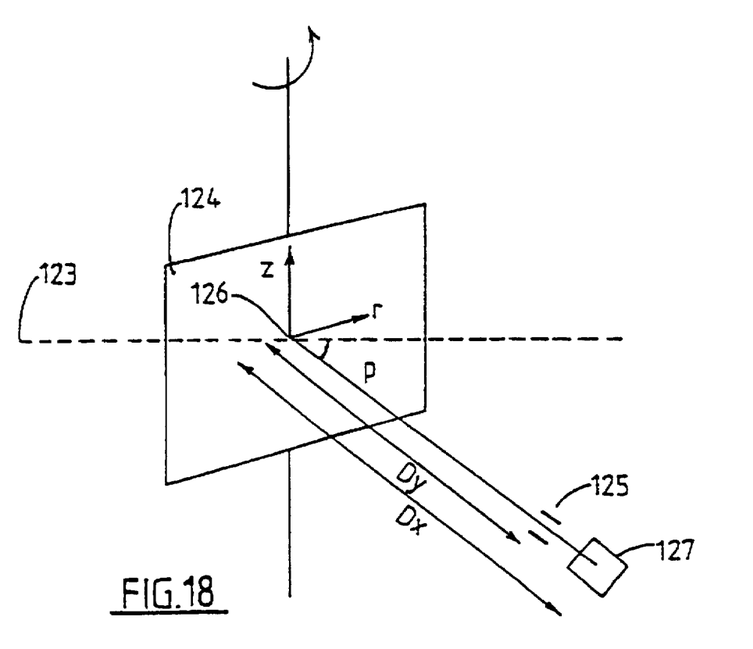
FIG. 18: illustrates the parameters used in the image transformation equations.

Referring now to FIG. 18 the equations required to calculate the X and Y deflection co-ordinates for a gun below the equator of a planar screen will be considered. The object to be displayed is initially stored in 3-D object co-ordinates (x, y, z). These co-ordinates must be converted into beam deflection co-ordinates X, Y for the image to be written to the rotating screen. The Cartesian object co-ordinates (x,y,z) are initially transformed into cylindrical polar co-ordinates (r,z,Θ). For a gun at angle p below the equator the parameters are indicated in FIG. 3. The equator 123 is the plane formed by rotation of a line perpendicular to the centre 126 of rotating screen 124. $D_y$ is the distance between the y deflection plates 125 and the centre of the screen 126. $D_x$ is the distance between x deflection plates 127 and the centre of the screen 126. The angle Θ (not shown) is the angle in the plane of the equator between the axis of an electron gun and an axis passing through the centre 126 of screen 124 perpendicular to the screen 124. The deflection coordinates (X, Y) of the electron gun are given by the equations:

$$X = \frac{D_x \, r \cos p \, \cos\Theta}{D_x \cos p + r \sin\Theta}$$

$$Y = \frac{D_y \, z \cos p - D_y \, r \sin p \, \sin\Theta}{D_y + r \cos p \, \sin p + z \sin p}$$

Objects to be displayed are preferably stored as a collection of points, lines and elliptical arcs. By using these object primitives less computation is required to transform (e.g. rotate) objects.

The number of vexels that can be displayed depends upon the move time and the dwell time chosen. The move time is the time it takes the beam to move from one vexel location to the next. The dwell time is the time that the beam must remain at each vexel location. Rather than use a different move time for each pair of vexels it is desirable for the beam deflection signal to consist of a fixed move and dwell time. The dwell time is governed by the beam and phosphor characteristics. If the move time is less than the time required to move to the next location the resulting voxel will be plotted out of position. To avoid this null voxels are included in which the beam intensity is zero. Alternatively, if the time required to reach the next voxel location is less than the move time then some plotting time is wasted. There is thus a trade off between a low move time which increases the number of voxels possible in each sector and minimises unproductive beam waiting time, versus a high value of move time to decrease the number of null voxels required. The preferred dwell time for the prototype apparatus used to date is about 0.3 microseconds and the move time is about 0.2 microseconds (approximately one fifth of the time required for a full scale deflection of the beam).

Figure 1:
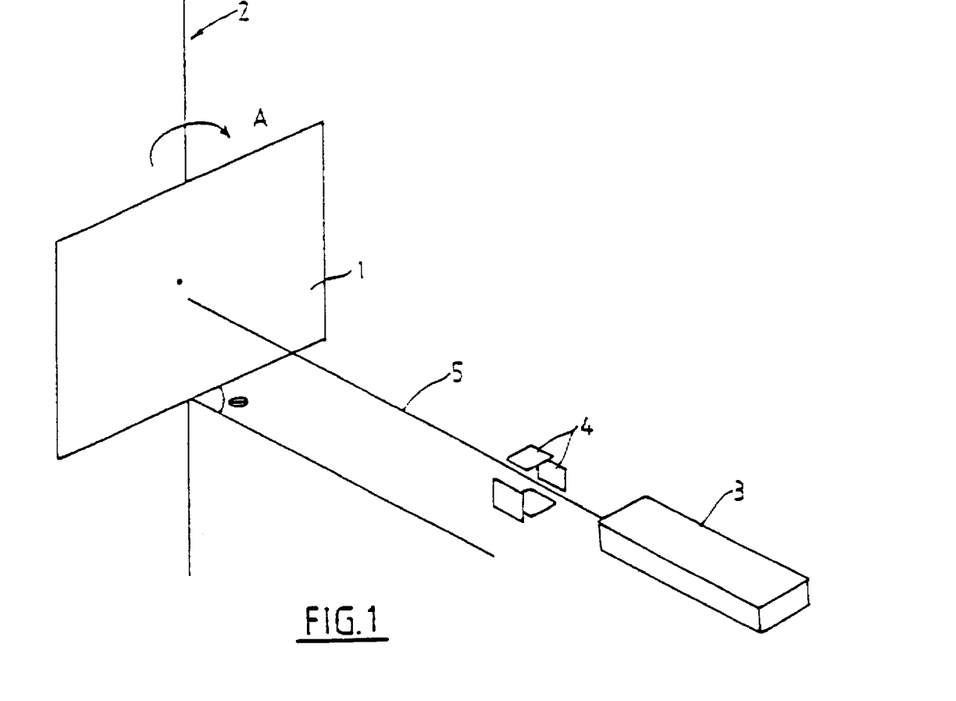
FIG. 1: Shows schematically the main components of a display system to illustrate the operation of the display.

For the examples illustrated in FIGS. 1 and 2 a simple dot graphics approach is used. As the time between the generation of each voxel depends upon the time taken to change the deflection voltages, it is preferable to illuminate the voxels in a manner minimising the electron beam move time.

Accordingly, it is preferred that some processing of the data is effected to determine which voxel should be illuminated next. Ideally the travelling salesman solution would be applied to solve the shortest path between all voxels. However, as the number of calculations required increases exponentially with the number of voxels to be connected, the processing time required would not be justified. Accordingly, a preferred method of processing the data is to divide the voxels into two equal groups, then divide these groups into two further equal groups, and so on until each group contains a number of voxels which can be easily processed. The travelling salesman approach can then be applied to each group of voxels so that maximum efficiency is gained within a group of voxels. This is a compromise so that undue demands are not placed upon processing.

If a constant number of sectors are used throughout the display volume it will be appreciated that the voxels at the outer edges of the cylindrical display volume are spaced further apart than those at the centre. To compensate for this more sectors may be provided towards the outer edges of the display volume. For example, 256 sectors may be displayed for the inner cylindrical volume of the image and 512 sectors may be displayed for the outer image volume. In a more sophisticated system a number of cylindrical volumes could be defined with the number of sectors increasing with increasing radius of the cylindrical volume. Ultimately the number of sectors could vary continuously in proportion with distance from the central axis of the display.

Figure 14:
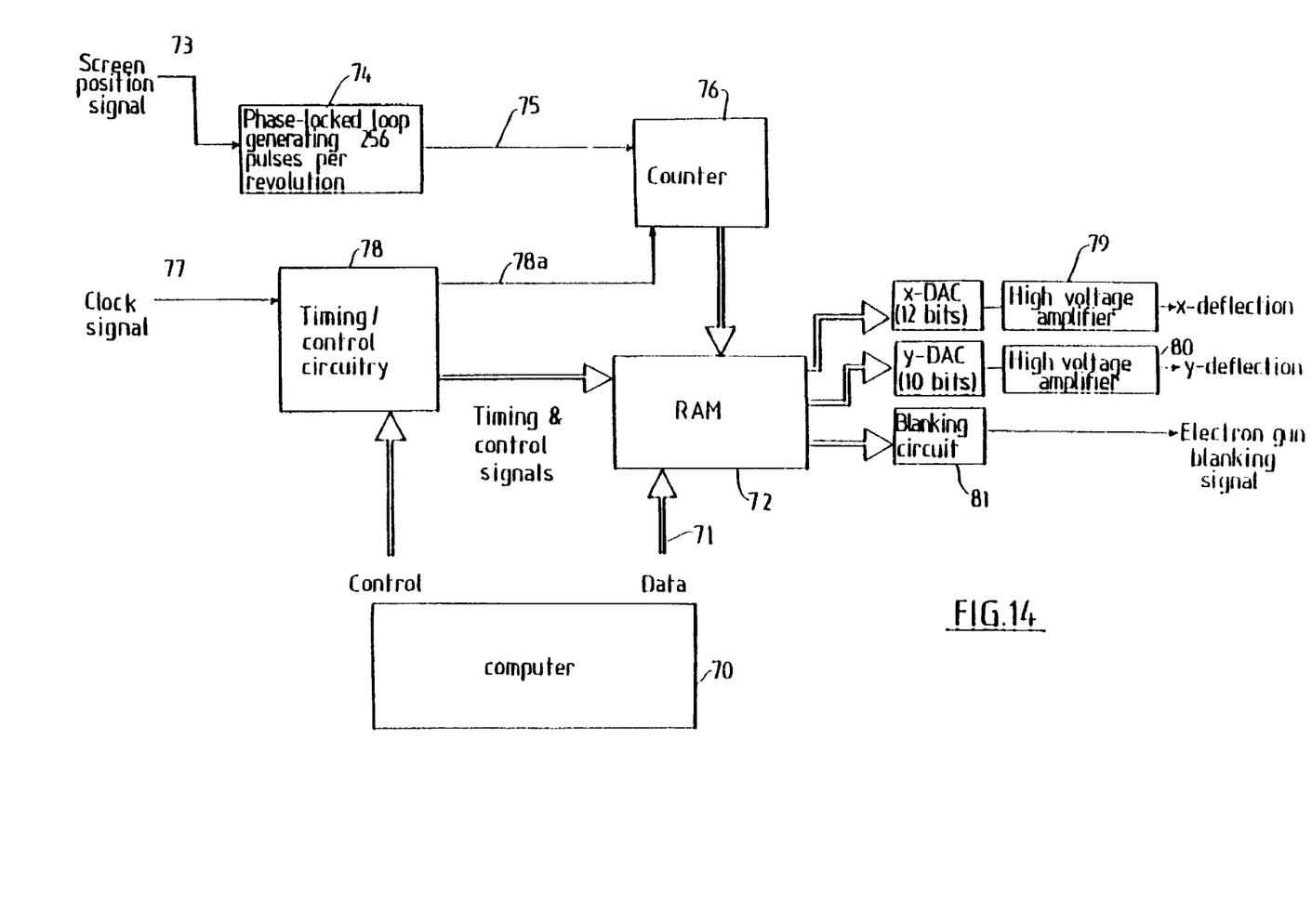
FIG. 14: shows a first display control circuit for driving each electron gun of the display.

Referring now to FIG. 14, circuitry for driving an electron gun of a display according to the first or second embodiment is shown. The data for generating an image is downloaded from a computer 70 via a parallel bus 71 to RAM 72. A portion of the RAM address may correspond to the sector to which the data relates. For example, for 256 sectors of 512 voxels each, A9–A16 would be the sector and A0–A8 would be the voxel within that sector. The number of possible voxels for a sector is dependent upon the bandwidth of the system and the number of sectors used (as previously described). At each such address 12 data bits relating to the X deflection of the electron gun, 10 data bits relating to the Y deflection of the electron gun and 2 blanking data bits are stored.

Twelve X deflection bits may be provided so that compensation may be made when the screen is at an oblique angle to the electron gun: i.e. when the screen is at an oblique angle to the electron gun the beam must be confined to a narrower width than the maximum X dimension. To maintain definition the same data must be compressed into the available beam width). The compression of data into the target beam area may be done via software.

An indexing signal 73 is supplied to a phase locked loop 74. The indexing signal may be generated when a laser beam 200 (FIG. 1b) is detected through a bore in the rotating shaft supporting the phosphor coated screen. The bore may be drilled at an angle slightly less than transverse to the axis of the shaft so that only one pulse is generated per revolution.

The indexing pulse 73 supplied to phase locked loop 74 ensures that the phase locked loop remains synchronised with rotation of the screen. Phase locked loop 74 produces output pulses on line 75 a number of times per revolution of the screen, corresponding to the number of sectors used in the system. For example, for 256 sectors, phase locked loop 74 produces 256 evenly spaced pulses per revolution of the phosphor coated screen. The output signal supplied via line 75 to counter 76 advances the counter to increment the sector portion of the address.

A clock signal 77 is supplied to timing and control circuitry 78. Clock signal 77 is twice the frequency at which the voxels are to be written. The output signal on line 78a increments the voxel number in counter 76.

Accordingly, for the first sector a pulse may be supplied to counter 76 which resets the sector portion of the address to 0. The voxel portion of the address starts at 0. The initial address is thus 0. Timing and control circuitry 78 provides pulses to counter 76 to increment the voxel portion of the counter to 511. The final address generated is thus 511. The sector counter is then incremented and the voxel counter reset for the next sector: i.e. address 512.

The addresses are sequentially supplied to RAM 72 which outputs the data corresponding to each address. The 12 X data bits are supplied to X deflection amplifier 79, the 10 Y data bits are supplied to Y deflection amplifier 80 and the blanking data bits are supplied to blanking circuit 81. Preferably 2 blanking data bits are provided to enable the electron gun to be turned on for a dot, turned on for a line or not turned on at all.

This circuit suffered from the disadvantage that all voxel values, including null values, had to be stored in RAM. This was very inefficient. Further, dynamic control of the number of sectors was impossible. The main disadvantage however was that it was not possible to display animated images.

FIG. 15 shows an improved circuit in which these problems are substantially overcome. The circuit may be in the form of a card fitted in a slot of a 486 personal computer. In this circuit two banks of RAM 85 and 86 are provided. This allows an image to be written to one bank of RAM whilst the image data is being retrieved from the other bank of RAM, thus allowing real time animation. The banks are selected by a signal from computer 88 on control line 87. Computer 88 writes to RAM banks 85 and 86 via address bus 89 and data bus 90.

Oscillator 91 provides a clock signal to timer 92. Timer 92 provides a voxel clock on line 93 to counter 94. Computer 88 can communicate with counter 94 to load new values directly from the computer.

In this circuit only the voxels to be displayed are stored in RAM. Operation of the circuit is controlled by computer 88. The computer communicates control and data information with timer 92 via bus 95. Line 95 provides timer 92 with data regarding the number of voxels in the next sector. Timer 92 produces the number of voxel clock pulses on line 93 required for that sector. The sector value is loaded into counter 94 via bus 100 from computer 88.

For example, for sector 0 address 0 may be loaded into counter 94. If there are 23 voxels to be written in sector 0 then the computer communicates this to timer 92 via bus 95. Thus 23 voxel clock pulses are generated. Timer 92 produces 23 voxel clock pulses on line 93. The counter sequentially outputs the addresses 0 to 22. The data at each address is sequentially obtained from the selected RAM bank 85, 86. This data is provided to digital to analogue converters (DAC's) 102 and 103 and blanking circuitry 98.

Once 23 pulses have been generated timer 92 produces a sector interrupt signal on line 99 to computer 88. The computer then downloads the next sector information to counter 94 and timer 92. This circuit enables much more flexible control of the display apparatus. For example, the number of sectors can be set in software.

If the X deflection values are scaled in software then the output of X-DAC may be supplied directly to amplifier 96. This however requires the use of an expensive high precision analogue to digital converter. According to the preferred embodiment shown in FIG. 15 the X deflection signal is multiplied by a sinusoidal function as described below.

Referring now to FIG. 17 a screen 120 is shown in positions A and B. In position A the screen is perpendicular to the beam of electron gun 121. In this position screen 120 presents the largest target area with the range of X deflection angles being given by angle "a". In position B screen 120 is at a much more acute angle to gun 121 and presents a smaller target area with the range of X-deflection angles being given by angle "b". When screen 120 is at acute angles to the axis of gun 121 small changes in X beam deflection produce a large change in the voxel position on the screen.

The width of the target area 122 varies in proportion with the sine of the angle of the screen with respect to the axis of the gun 121. According to the present invention the above problem may be overcome by multiplying the output of the analogue-to-digital converter for the X deflection plates by a sinusoidal function.

Referring again to FIG. 15 the output of X-DAC 102 is supplied to multiplier 104. A sinusoidal signal is generated by generator 105 and is supplied to another input of multiplier 104 via line 106. Screen position signal 101 synchronises the output of generator of 105 with the actual position of the screen. The output of multiplier 104 supplied to amplifier 96 is thus the original X deflection value scaled by the sinusoidal function so that the maximum deflection values match the target width of the screen. This allows an inexpensive 8 bit DAC to be used instead of a high precision DAC. The outputs of amplifiers 96 and 97 are supplied to the respective X and Y deflection plates.

Where in the aforegoing description reference has been made to integers or components having known equivalents then such equivalents are herein incorporated as if individually set forth. Although this invention has been described by way of example it is to be appreciated that improvements and/or modifications may be made thereto without departing from the scope of the invention as defined in the claims.

INDUSTRIAL APPLICABILITY

The display of the present invention may find application in airport radar systems, medical imaging, computer aided design, computer displays, teaching and military uses. It is to be appreciated however that the device of the invention is not limited to these applications and may find application in many other areas.

I claim:

1. A display system comprising:
   an evacuated enclosure, at least part of the enclosure being transparent;
   a phosphor coated screen within the enclosure;
   means to rotate the screen within the enclosure so that the screen sweeps out a display volume;
   one or more electron gun within the enclosure positioned so that images may be written to the screen as it sweeps out the display volume;
   control means to provide drive signals to the one or more electron gun in accordance with image information supplied thereto; and
   wherein each side of the screen is divided into two halves about the axis of rotation of the screen, each of the four screen halves being coated with a phosphor producing a different colored light when excited by an electron beam.

2. A display system as claimed in claim 1 wherein the screen is generally planar.

3. A display system as claimed in claim 1 wherein three electron guns are provided circumferentially spaced apart about the axis of rotation of the screen.

4. A display system as claimed in claim 3 wherein the electron guns are evenly circumferentially spaced about the axis of rotation of the screen below the display volume.

5. A display system as claimed in claim 4 wherein the axis of each electron gun is oriented at an angle of between 30° to 65° to the axis of rotation of the screen.

6. A display system as claimed in claim 5 wherein the axis of each electron gun is oriented at an angle of between 40° to 60° to the axis of rotation of the screen.

7. A display system as claimed in claim 1, wherein a substantially optically transparent phosphor film is applied to part of the surface of a first side of the screen and a substantially optically transparent phosphor film is applied to a complementary part of the surface of the other side.

8. A display system as claimed in claim 7, wherein complementary halves of the two screen sides are phosphor coated.

9. A display system as claimed in claim 1, wherein the screen is in the shape of a helix and rotates about the axis of the helix, the one or more electron gun being a single electron gun, the axis of which is substantially in alignment with the axis of the helix, and a conductor is provided along the axis of the helix which terminates proximate the end of the helix adjacent the electron gun, an electrical path being provided from the conductor to the exterior of the enclosure to allow a bias voltage to be applied to the conductor to attract an electron beam towards from the center of the helix.

10. A display system as claimed in claim 9, wherein the bias voltage is applied to the conductor to repel an electron beam away from the center of the helix.

11. A display system as claimed in claim 9, wherein the helix is supported within a transparent cylinder.

12. A display system as claimed in claim 9, wherein for each sector, a staircase voltage is supplied to the conductor to produce a raster scan in the form of a series of concentric circles.

13. A display system as claimed in claim 9, wherein for each sector, a ramp voltage is supplied to the conductor to produce a raster scan in the form of a spiral.

14. A display system according to claim 1, wherein the control means includes two banks of memory which alternately supply image information for a current image to the display system and store image information for the next image.

15. A display system as claimed in claim 1, wherein the phosphor coating is selected from a group comprising phosphor P31, P5, P20 and P45.

16. A display system as claimed in claim 2, wherein the screen is formed of material selected from a group comprising glass and wire mesh.

17. A display system as claimed in claim 1, wherein the means to rotate include a motor outside the enclosure which rotates a first magnetic coupling and a second magnetic material coupling being located opposite the first magnetic coupling within the enclosure connected to the screen.

18. A display system according to claim 1, wherein the means to rotate rotates the screen at a speed of about or greater than 15 hz.

19. A display system as claimed in claim 16, wherein the screen is between substantially 0.2 mm to 2 mm thick.

20. A display system as claimed in claim 1, wherein the phosphor coating of the screen is translucent.

21. A display system as claimed in claim 1, wherein the colors are red, green, blue and white.

22. A display system comprising:
   an evacuated enclosure, at least part of the enclosure being transparent;
   a phosphor coated screen within the enclosure;
   means to rotate the screen within the enclosure so that the screen sweeps out a display volume;
   one or more electron gun within the enclosure positioned so that images may be written to the screen as it sweeps out the display volume;
   control means to provide drive signals to the one or more electron gun in accordance with image information supplied thereto; and
   a conductor provided around the periphery of the screen, an electrical path being provided from the conductor to a detector outside the enclosure which supplies an alignment signal to the control means when an electron beam hits the conductor.

23. A display system as claimed in claim 22, wherein the conductor follows a rectangular path around the periphery of the screen.

24. A display system as claimed in claim 22, wherein to calibrate perpendicularity of the screen with respect to the axis of an electron gun, the control means drives the one or more electron gun to rapidly scan an electron beam across the screen as the screen rotates, and the control means includes means to time the period between alignment signals for each scan to determine the angle at which the screen is perpendicular to the electron gun.

25. A display system as claimed in claim 22, wherein to calibrate rotation and translation of an image written to the screen, the control means drives the one or more electron gun through a series of vertical scans along the screen and horizontal scans across the screen for a particular angle of rotation, the control means calculating rotation and translation from the alignment signals and altering drive signals to the one or more electron gun to compensate for rotation and/or translation.

* * * * *